(12) United States Patent
Higashiyama et al.

(10) Patent No.: US 6,948,557 B2
(45) Date of Patent: Sep. 27, 2005

(54) INNER FIN FOR HEAT EXCHANGER FLAT TUBES AND EVAPORATOR

(75) Inventors: Naohisa Higashiyama, Oyama (JP); Masayuki Tsukahara, Omaya (JP)

(73) Assignee: Showa Denko K.K. (JP)

( * ) Notice: Subject to any disclaimer, the term of this patent is extended or adjusted under 35 U.S.C. 154(b) by 111 days.

(21) Appl. No.: 10/466,833

(22) PCT Filed: Jan. 21, 2002

(86) PCT No.: PCT/JP02/00373

§ 371 (c)(1),
(2), (4) Date: Jul. 22, 2003

(87) PCT Pub. No.: WO02/057700

PCT Pub. Date: Jul. 25, 2002

(65) Prior Publication Data

US 2004/0050541 A1 Mar. 18, 2004

Related U.S. Application Data

(60) Provisional application No. 60/302,654, filed on Jul. 5, 2001.

(30) Foreign Application Priority Data

Jan. 22, 2001 (JP) ........................................ 2001-012653

(51) Int. Cl.[7] ................................................ F28F 13/12
(52) U.S. Cl. ..................... 165/109.1; 165/177; 165/183
(58) Field of Search .............................. 165/109.1, 177, 165/183

(56) References Cited

U.S. PATENT DOCUMENTS

| | | | | | |
|---|---|---|---|---|---|
| 2,488,615 A | * | 11/1949 | Arnold | .......................... | 138/38 |
| 5,517,757 A | * | 5/1996 | Hayashi et al. | ......... | 29/890.039 |
| 5,560,424 A | * | 10/1996 | Ogawa | ......................... | 165/183 |

FOREIGN PATENT DOCUMENTS

| | | | | |
|---|---|---|---|---|
| EP | 953816 | | 11/1999 | |
| JP | 57-105690 | | 7/1982 | |
| JP | 58221390 A | * | 12/1983 | .............. F28F/1/40 |
| JP | 2000-320994 | | 11/2000 | |

\* cited by examiner

*Primary Examiner*—Allen J. Flanigan
(74) *Attorney, Agent, or Firm*—Oblon, Spivak, McClelland, Maier & Neustadt, P.C.

(57) ABSTRACT

The present invention relates to an inner fin 5 for heat exchanger flat tubes 22A which comprises a metal plate having a corrugated cross section and which is to be enclosed in the flat tube 22A, all ridges 51 and all furrows 52 of the inner fin being joinable to an inner surface of the flat tube 22A by brazing. At least one of the ridges 51 and the furrows 52 of the inner fin 5 is provided with a turbulence promoting protrusion 53 facing toward a side opposite to the side to be brazed. The turbulence promoting protrusion 53 is so sized that a clearance to be created between a caved portion 54 formed on a rear side of the protrusion and the inner surface of the flat tube 22A can be filled with a brazing material 6. A fluid to be passed through the flat tube 22A is caused to flow in a more turbulent state by the protrusion 53 to thereby achieve an improved heat transfer efficiency.

3 Claims, 5 Drawing Sheets

INNER FIN FOR HEAT EXCHANGER FLAT TUBES AND EVAPORATOR

CROSS REFERENCE TO RELATED APPLICATIONS

This application is an application filed under 35 U.S.C. §111(a) claiming the benefit pursuant to 35 U.S.C. §119(e)(1) of the filing data of Provisional Application No. 60/302,654 filed Jul. 5, 2001 pursuant to 35 U.S.C. §111(b).

TECHNICAL FIELD

The present invention relates to inner fins for heat exchanger flat tubes, and to evaporators which are adapted, for example, for use as those for motor vehicle air conditioners and which have incorporated therein such inner fins.

BACKGROUND ART

In evaporators for motor vehicle air conditioners, it has heretofore been practice to arrange inner fins in flat tubes to give an increased heat transfer area to the refrigerant and thereby achieve improved performance.

Already known as such an inner fin is one comprising a metal sheet of corrugated cross section and enclosed in a flat tube. The inner fin has all ridges and furrows thereof brazed to the inner surface of the flat tube.

The inner fin described has been given an increased heat transfer area by diminishing the spacing between the ridges and the furrows, i.e., the fin pitch, whereas difficulties are encountered in fabricating inner fins having a further decreased fin pitch. It has also been found that if realized, further diminished fin pitches are unable to achieve correspondingly improved effects.

An object of the present invention is to provide an inner fin for heat exchanger flat tubes which comprises a metal sheet of corrugated cross section and which is adapted to achieve a further improved heat transfer efficiency without diminishing the fin pitch. Another object of the invention is to provide an evaporator wherein the above inner fin is used and which is thereby improved in performance.

DISCLOSURE OF THE INVENTION

The present invention provides an inner fin for heat exchanger flat tubes which comprises a metal plate having a corrugated cross section and which is to be enclosed in the flat tube, all ridges and all furrows of the inner fin being joinable to an inner surface of the flat tube by brazing, the inner fin being characterized in that at least one of the ridges and the furrows is provided with a turbulence promoting protrusion facing toward a side opposite to the side to be brazed, the turbulence promoting protrusion being so sized that a clearance to be created between a caved portion formed on a rear side of the protrusion and the inner surface of the flat tube can be filled with a brazing material.

When at least one of all the ridges and all the furrows of the inner fin is provided with a turbulence promoting protrusion facing toward a side opposite to the side to be brazed, the fluid to be passed through the flat tube wherein the inner fin is enclosed is caused to flow in a more turbulent state by the protrusion to thereby achieve a higher heat transfer efficiency. Moreover, since the turbulence promoting protrusion is so sized that the clearance to be created between the caved portion formed on the rear side of the protrusion and the inner surface of the flat tube can be filled with a brazing material, a plurality of fluid channels formed within the flat tube by the inner fin and arranged in parallel widthwise of the tube are prevented from communicating with one another and will not involve increased flow resistance. The inner fin of the invention for heat exchanger flat tubes is therefore improved in heat transfer efficiency by the turbulence promoting protrusion without reducing the fin pitch.

The turbulence promoting protrusion produces the secondary effect to be described below. While many of such inner fins, which are made from a metal sheet, are temporarily stored as arranged one above another in the form of a stack, the fins are difficult to separate if held in intimate contact with one another, possibly causing trouble in assembling heat exchangers. If the inner fins are provided with such protrusions, the inner fins are held out of intimate contact with one another even when stacked up in a large number. The inner fins are then easy to take out one by one from the stack to ensure a high efficiency in assembling heat exchangers. From the viewpoint of the intimate contact preventing effect, it is desired that the protrusions be formed in ridges and/or furrows at least in the vicinity of opposite edges of the inner fin, whereby fins are made easy to separate one by one even if stacked up in a large number.

With the inner fin of the invention for heat exchanger flat tubes, the turbulence promoting protrusion has a dimension of 1 to 1.5 mm longitudinally of the inner fin and a height of 0.2 to 0.4 mm.

If the protrusion measures less than 1 mm longitudinally of the inner fin and less than 0.2 mm in height, such turbulence as will contribute to an improvement in heat transfer efficiency will not occur in the fluid. On the other hand, if the protrusion measures more than 1.5 mm along the length of the inner fin and in excess of 0.4 mm in height, there is the possibility of failing to fill up the clearance between the caved portion on the rear side of the protrusion and the inner surface of the flat tube with the brazing material, and excessive flow resistance will then be offered.

Turbulence promoting protrusions may be provided randomly with respect to the widthwise direction of the inner fin, or may be formed at a predetermined interval, for example, in every three furrows. One or a plurality of turbulence promoting protrusions may be formed in one ridge or furrow. When to be provided, a plurality of protrusions may be arranged with a definite pitch or randomly. When a plurality of protrusions are to be formed in one ridge or furrow, there is a need to determine the number and pitch of protrusions so as to avoid excessive flow resistance.

The inner fin is prepared usually by roll forming. In this case, the protrusion can be formed simultaneously with the forming of the inner fin itself by using a pair of forming rolls having a projection and a cavity respectively at corresponding portions.

The flat tube for use in heat exchangers for enclosing therein the inner fin of the invention is not limited particularly but can be, for example, an electric resistance welded tube, or a flat tubular portion comprising a pair of dishlike plates each having a flat tube forming portion and joined to each other face-to-face. In the latter case, the inner fin of the invention is disposed in each of two flat tubular portions formed by a pair of dishlike plates each of which has a partition ridge and flat tube forming portions at opposite sides of the partition ridge and which are joined to each other as arranged face-to-face. The two inner fins may have adjacent edges which are made integral with each other by a joint portion, which is interposed between the partition ridges of the two dishlike plates.

The ridges and the furrows of the inner fin are brazed to the inner surface of the flat tube, for example, by preparing at least one of the inner fin and the flat tube from a brazing sheet and using the brazing material cladding the sheet surface. Usually, however, the flat tube only is made from the brazing sheet.

The present invention further provides an evaporator comprising a plurality of flat tubes, each of the flat tubes having enclosed therein the inner fin of the invention, the inner fin having all the ridges and all the furrows thereof brazed to the inner surface of the flat tube.

The turbulence promoting protrusions of the inner fins improve the efficiency of heat exchange between the refrigerant flowing through the flat tubes and the air to be cooled and flowing externally of the flat tubes, consequently enabling the evaporator to exhibit outstanding performance.

The evaporator according to the invention can be a layered evaporator comprising flat tubes which are provided by flat tubular portions formed by pairs of dishlike plates each having a flat tube forming recessed portion, the pair of dishlike plates being joined to each other as arranged face-to-face.

BEST MODE OF CARRYING OUT THE INVENTION

FIGS. 1 to 4 show an embodiment of the present invention. The illustrated embodiment is suitable for use in layered evaporators for motor vehicle air conditioners.

Figure 1:
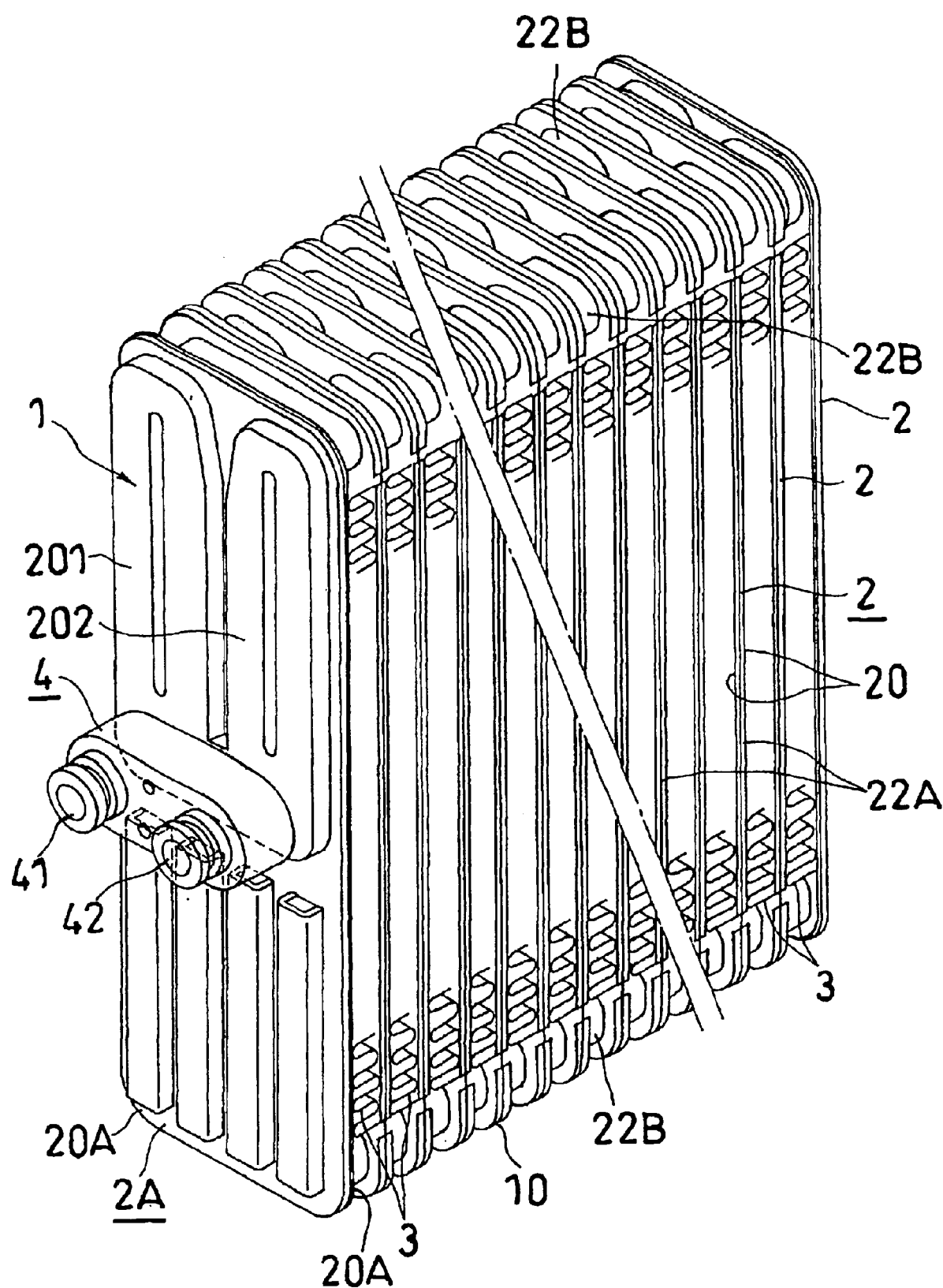
FIG. 1 is a perspective view showing an embodiment of the invention, i.e., a layered evaporator for motor vehicle air conditioners.

FIG. 1 shows the entire layered evaporator for motor vehicle air conditioners. The evaporator 1 has an evaporator core 10 comprising a plurality of tube elements 2, 2A which are joined to one another by outer fins 3 and each of which comprises a pair of dishlike plates 20, 20A facing and joined to each other. The evaporator core 10 comprises a plurality of front flat tubular portions 22A arranged side by side laterally, a plurality of rear flat tubular portions 22A arranged side by side laterally, a front upper header 22B and a front lower header 22B for interconnecting the upper ends and lower ends of the front flat tubular portions 22A in communication, and a rear upper header 22B and a rear lower header 22B for interconnecting the upper ends and lower ends of the rear flat tubular portions 22A in communication, these components being provided by the tube elements 2 other than the tube element at the left end. The tube element 2A at the left end has a refrigerant inlet passageway 201 and a refrigerant outlet passageway 202. Attached to the outer side of this tube element 2A is a pipe coupling block 4 having a refrigerant inlet pipe connecting opening 41 and a refrigerant outlet pipe connecting opening 42. Partition walls (not shown) are provided in the headers 22B at required portions thereof. Via the inlet pipe connecting opening 41 and the inlet passageway 201, a refrigerant flows into the left end of the rear upper header 22B, then flows through all the headers 22B and the flat tubular portions 22A in a predetermined pattern, thereafter flows out of the left end of the front upper header 22B and is discharged via the outlet passageway 202 and the outlet pipe connecting opening 42.

Figure 2:
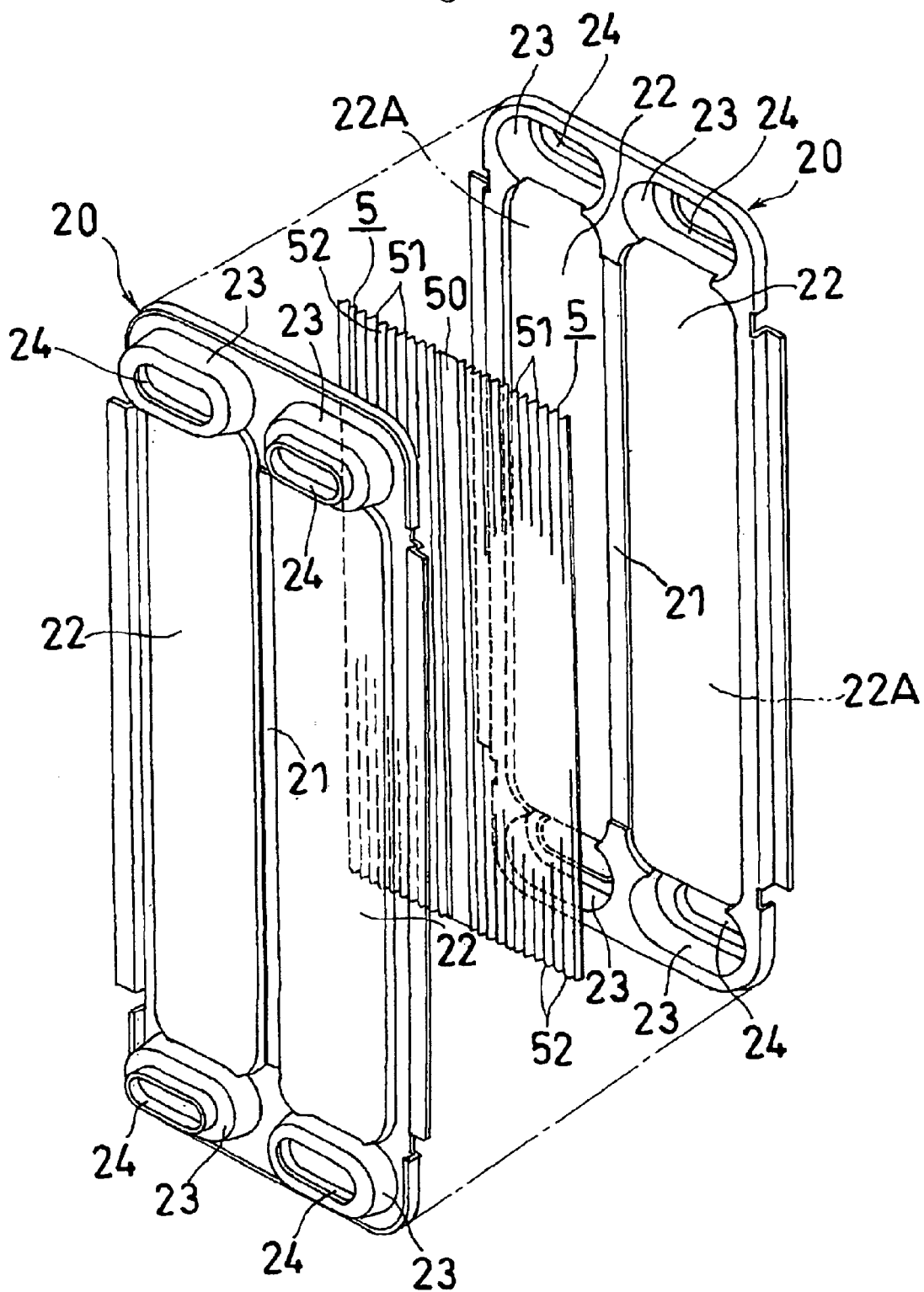
FIG. 2 is a perspective view showing two dishlike plates constituting a tube element, and an inner fin to be provided inside of these plates.

FIG. 2 shows two dishlike plates 20 constituting each of the tube elements 2 other than the element 2A at the left end, and inner fins 5 enclosed with these plates 20. The dishlike plates 20 are prepared from a blazing sheet clad with a brazing material over opposite surfaces thereof. Each dishlike plate 20 has a vertical partition ridge 21 at the widthwise center portion thereof to provide flat tube forming recessed portions 22 respectively at the front and rear sides of the ridge 21. The dishlike plate 20 further has header forming recessed portions 23 integral with the upper and lower ends of the front and rear flat tube forming recessed portions 22. A refrigerant passage aperture 24 is formed in the bottom wall of the recessed portion 23. However, no aperture 24 is formed in the bottom walls of required header forming recessed portions 23 of some dishlike plates 20. These bottom walls provide partition walls. The two dishlike plates 20 are jointed to each other face-to-face, whereby front and rear two flat tubular portions 22A are formed. Two inner fins 5 are arranged respectively in these two tubular portions 22A and are those embodying the present invention. The two inner fins 5 have adjacent edges which are made integral with each other by a joint portion 50 which is interposed between the partition ridges 21 of the two dishlike plates 20.

Figure 3:
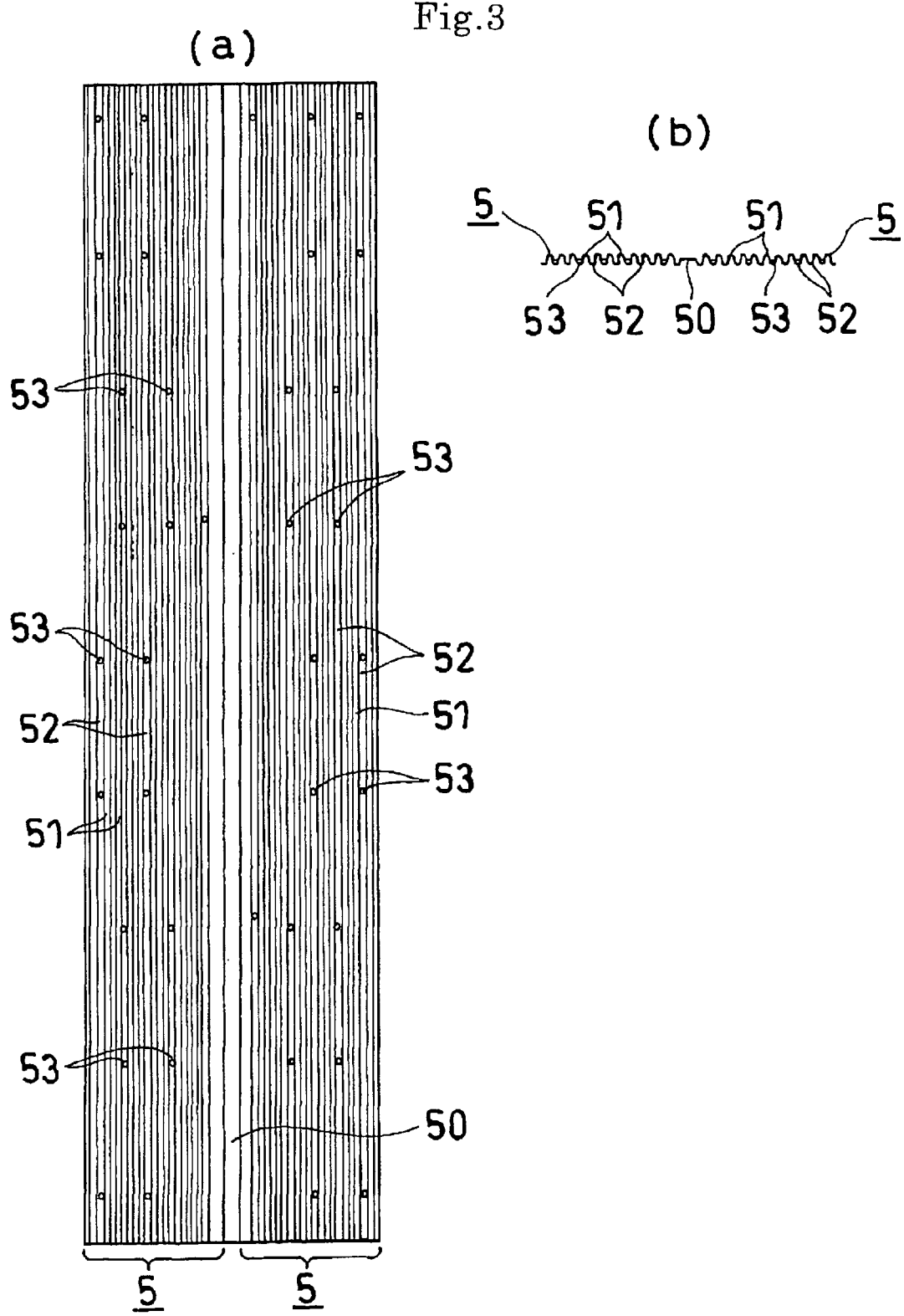
FIG. 3, (a) is a side elevation of the inner fin, and (b) is a cross sectional view of the inner fin.
Figure 4:
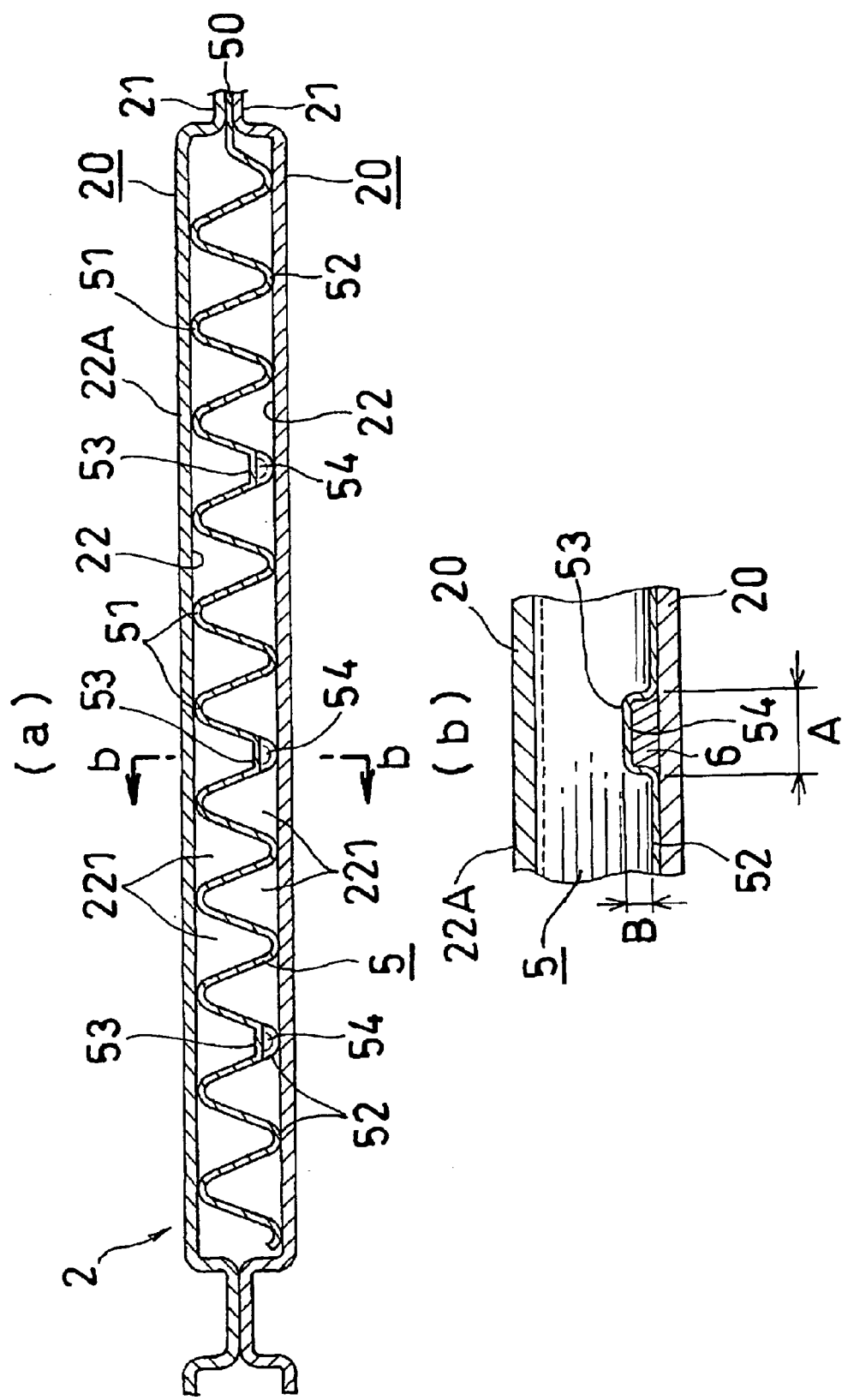
FIG. 4, (a) is an enlarged fragmentary view in cross section showing the inner fin as enclosed in a flat tubular portion, and (b) is an enlarged fragmentary view in longitudinal section taken along the line b—b in (a).

With reference to FIGS. 2 to 4, the inner fin 5 of the present invention comprises an aluminum alloy sheet having a corrugated cross section and formed by roll forming. The inner fin 5 is enclosed in the flat tubular portion 22A and all ridges 51 and all furrows 52 are joined to the inner surface of the flat tubular portion 22A by brazing. The inner fin 5 forms a plurality of refrigerant channels 221 arranged side by side from the front rearward in the interior of the tubular portion 22A. As shown in FIGS. 3 and 4, a plurality of furrows 52 of the inner fin 5 are provided with turbulence promoting protrusions 53 facing toward a direction opposite to the brazed side of these furrows.

Such inner fins 5 are formed by cutting an aluminum alloy sheet of corrugated cross section into specified lengths, and thereafter temporarily stored as stacked up in layers. In this state, the adjacent inner fins 5 are held out of intimate contact with each other due to the presence of turbulence promoting protrusions 53. Accordingly, the inner fins 5 can be taken out one by one from the stack easily to ensure efficient work in assembling the evaporator 1.

In each of the front and rear inner fins 5 shown in FIG. 3, the furrows 52 provided with turbulence promoting protrusions 53 are five in number. This number corresponds to about one fifth of the combined number (=23) of all ridges 51 and all furrows 52 of the fin. The five furrows 52 provided with the protrusions 53 are arranged randomly with respect to the widthwise direction of the inner fin as seen in FIG. 3. Each of the five furrows 52 has one to five protrusions 53.

With reference to FIG. 4, (b), a clearance created between a caved portion 54 formed on the rear side of the protrusion 53 and the inner surface of the flat tubular portion 22A is filled with a brazing material 6. [The brazing material is not shown in FIG. 4, (a).] The turbulence promoting protrusion 53 is 1 mm in dimension A along the length of the inner fin and 0.4 mm in height B.

With the evaporator 1 described above, the refrigerant flowing through the refrigerant channels 221 within the flat tubular portion 22A is in a boiling state and therefore usually turbulent, whereas the turbulence promoting protrusions 53 formed in the inner fin 5 produce a greater turbulent flow to thereby achieve an improved heat transfer efficiency. The refrigerant flows straight through each refrigerant channel 221 without deflecting into other channel 221. This results in diminished resistance to the flow.

Figure 5:
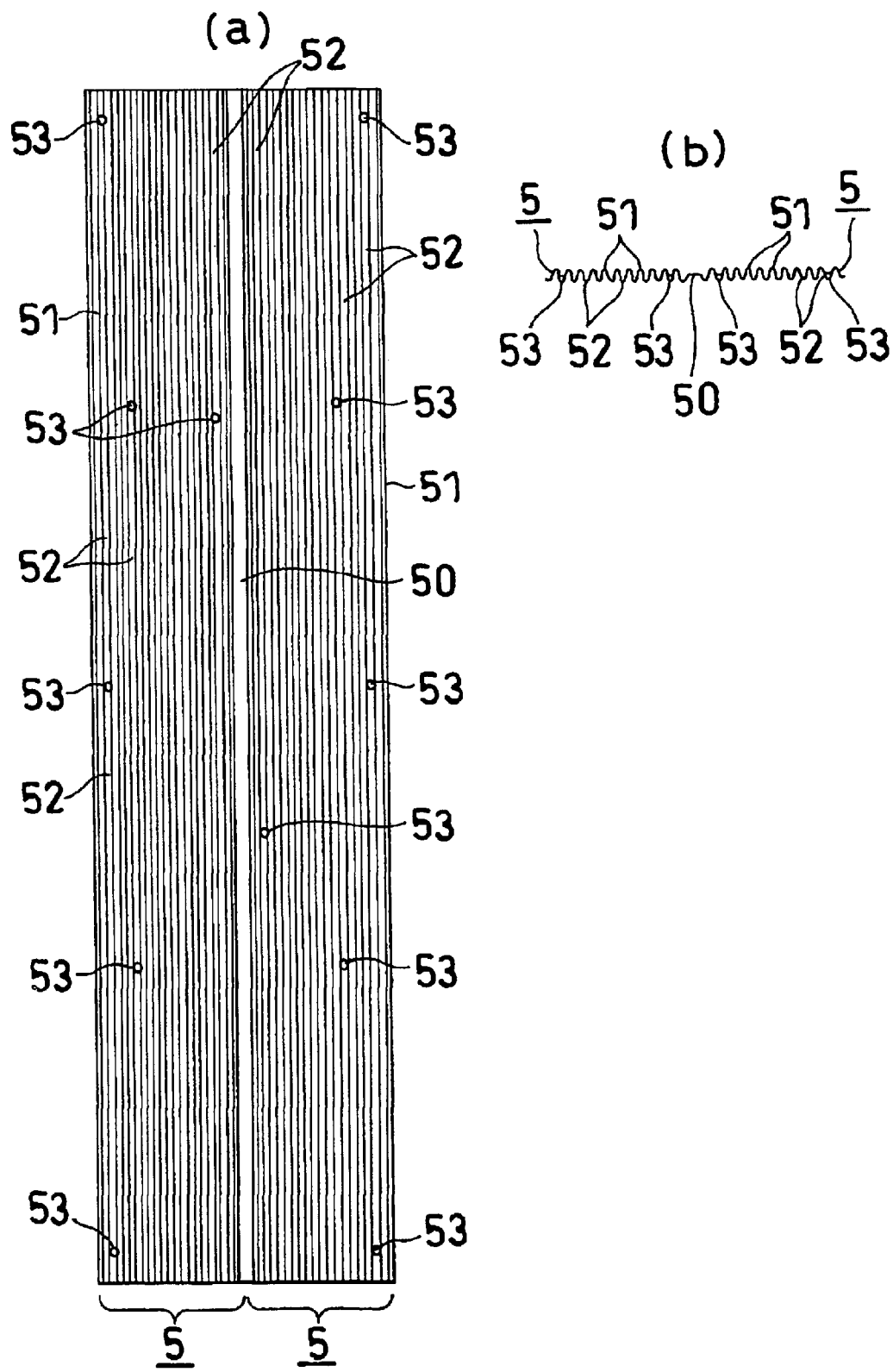
FIG. 5 shows another embodiment of the invention; (a) being a side elevation of an inner fin, (b) being a view in cross section of the inner fin.

FIG. 5 shows another embodiment of the invention. With reference to FIG. 5, each of front and rear inner fins 5 made integral with each other by a joint portion 50 has turbulence promoting protrusions 53 which are formed in three furrows 52 positioned in the vicinity of the front and rear edges of the fin. One to three protrusions 53 are formed in each of the three furrows 52. With the exception of this feature, the second embodiment is the same as the first embodiment shown in FIGS. 1 to 4.

The embodiments described above are merely illustrative examples. The present invention can of course be practiced as suitably modified without departing from the gist of the invention as set forth in the appended claims.

INDUSTRIAL APPLICABILITY

As described above, the present invention is useful for improving the efficiency of heat exchangers which comprise flat tubes having inner fins arranged therein. The invention is useful especially for improving the efficiency of evaporators such as those for motor vehicle air conditioners.

What is claimed is:

1. An inner fin for a heat exchanger flat tube, the inner fin comprising a metal plate having a corrugated cross section, the inner fin being enclosed in the flat tube, ridges and furrows of the inner fin being joinable to an inner surface of the flat tube by brazing, at least one of the ridges and the furrows being provided with a turbulence promoting protrusion facing toward a side opposite to a side to be brazed, the turbulence promoting protrusion being so sized that a clearance to be created between a caved portion formed on a rear side of the turbulence promoting protrusion and the inner surface of the flat tube can be filled with a brazing material, and the turbulence promoting protrusion having a dimension of 1 to 1.5 mm longitudinally of the inner fin and a height of 0.2 to 0.4 mm.

2. An evaporator comprising a plurality of flat tubes, each of the flat tubes having enclosed therein an inner fin according to claim 1, the inner fin having the ridges and the furrows thereof brazed to the inner surface of the flat tube.

3. An evaporator according to claim 2 wherein the flat tubes are provided by flat tubular portions formed by pairs of dishlike plates, each pair of dishlike plates facing and being joined to each other.

* * * * *

UNITED STATES PATENT AND TRADEMARK OFFICE
CERTIFICATE OF CORRECTION

PATENT NO. : 6,948,557 B2
DATED : September 27, 2005
INVENTOR(S) : Higashiyama et al.

It is certified that error appears in the above-identified patent and that said Letters Patent is hereby corrected as shown below:

<u>Title page,</u>
Item [73], should read -- [73] Assignee: Showa Denko K.K., Tokyo (JP) --.

Signed and Sealed this

Sixth Day of December, 2005

JON W. DUDAS
*Director of the United States Patent and Trademark Office*